United States Patent [19]

Santopietro et al.

[11] Patent Number: 5,404,759
[45] Date of Patent: Apr. 11, 1995

[54] ACOUSTICALLY QUIET, PASSIVE LOAD FOR TESTING LOW-SPEED MOTORS

[75] Inventors: Richard F. Santopietro, Waterford; Gregory J. Majewski, Uncasville, both of Conn.

[73] Assignee: The United States of America as represented by the Secretary of the Navy, Washington, D.C.

[21] Appl. No.: 187,330

[22] Filed: Jan. 26, 1994

[51] Int. Cl.⁶ .............................................. G01L 3/18
[52] U.S. Cl. ................................. 73/862.12; 73/116; 73/430
[58] Field of Search ............ 73/862.11, 862.12, 862.14, 73/862.191, 116, 430; 188/264 CC, 264 DF, 264 E, 71.6

[56] References Cited

U.S. PATENT DOCUMENTS

| | | | |
|---|---|---|---|
| 3,143,883 | 8/1964 | Nakasone | 73/430 |
| 3,286,204 | 11/1966 | Lambe, Jr. | 73/430 |
| 4,078,751 | 3/1978 | Stolzlechner | 73/430 X |
| 4,109,519 | 8/1978 | Bartlett et al. | 73/862.11 |
| 4,483,204 | 11/1984 | Warsaw | 73/862.12 |
| 5,003,829 | 4/1991 | DeConti et al. | 73/861.12 |

Primary Examiner—Richard E. Chilcot, Jr.
Assistant Examiner—Elizabeth L. Dougherty
Attorney, Agent, or Firm—Michael J. McGowan; Prithvi C. Lall; Michael F. Oglo

[57] ABSTRACT

The load absorbing device is housed in a fluid filled housing for cooling and vibration damping purposes. The device includes a rotating disc coupled to the motor output shaft, and brake calipers for engaging the disc periphery to incrementally increase the torque load on the motor. A support structure shields these components and serves as the support for the motor to be tested. Vibration isolating mounts are used to support both the motor and the housing for these components.

6 Claims, 1 Drawing Sheet

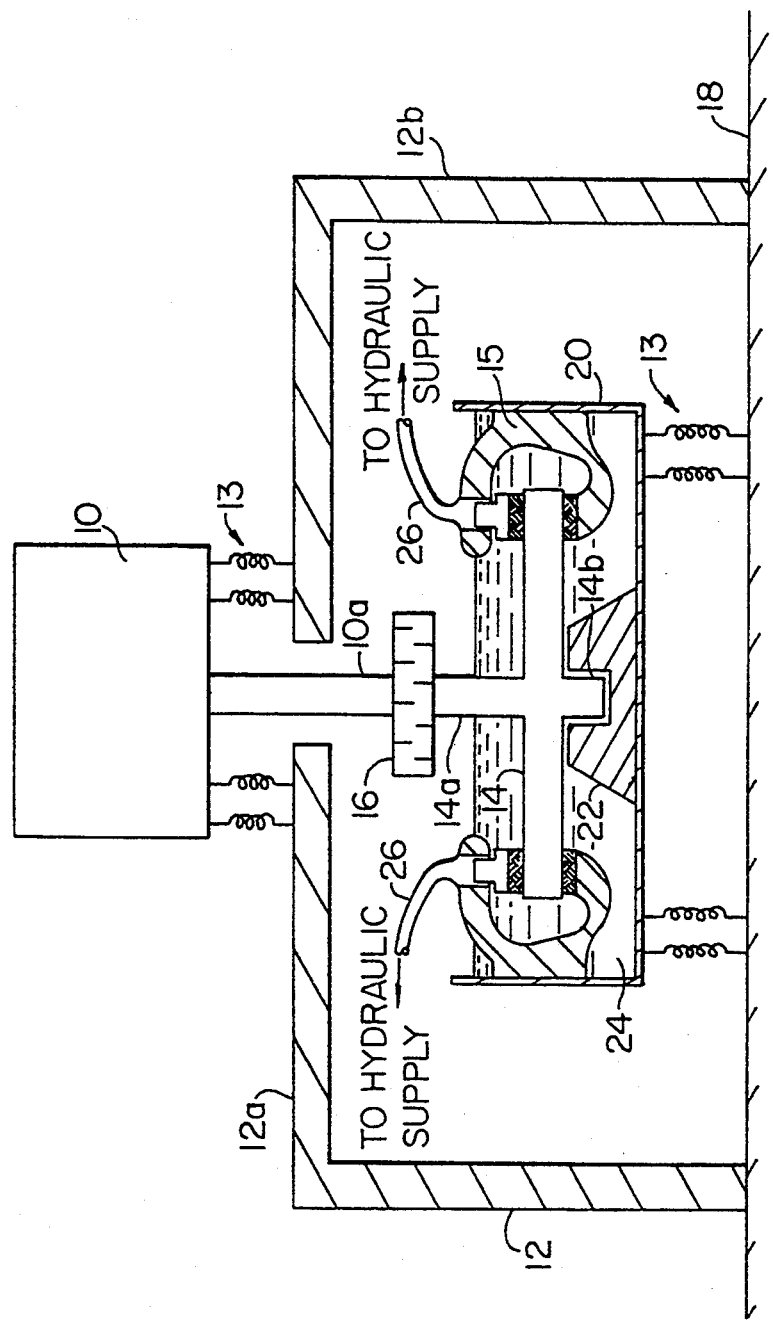

ACOUSTICALLY QUIET, PASSIVE LOAD FOR TESTING LOW-SPEED MOTORS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates to testing equipment, and more specifically to an acoustically quiet passive load device for use as a dynamometer for testing of low speed high output motors. Low speed high output motors are commonly used on ships and are required to operate without excessive acoustic noise and vibration. Such motors require testing by equipment that is designed to convert the power from the test motor into either potential energy or into energy absorbed by a device similar to that being tested. When potential energy is provided as the output large space requirements are an inherent disadvantage, as is the necessity for providing physical shielding mechanical barriers or the like to satisfy safety requirements. Where the power absorbing device is itself similar to the low speed high output motor being tested detection and measurement of the noise and vibration of the motor being tested can be very difficult to achieve.

2. Description of the Prior Art

Dynamometers with rotary discs or drums are well known. In particular, Bonomo U.S. Pat. No. 4,062,233 discloses a rotating drum dynamometer wherein the drum is mounted for rotation within a fluid filled container. Hydraulic brakes are provided around the exterior of the drum. Although this prior art patent does disclose a rotary type dynamometer, there is no suggestion of isolating the dynamometer structure so as to avoid vibration and noise from the load absorbing dynamometer itself as is required in a test setup for low speed high output motors of the invention disclosed herein.

Cline U.S. Pat. No. 2,597,450 discloses a cooling system for a disc type dynamometer, but here again there is no suggestion in Cline of isolating the dynamometer so as to prevent vibration feedback and acoustic noise in connection with the testing of low speed high output motors.

McClure U.S. Pat. No. 3,757,909 shows a dynamometer in the form of a water brake wherein a rotatable housing is provided with stator discs so that the discs can be either counterrotated or free to rotate in either direction in the process of absorbing torque. Here again there is no suggestion in McClure of a dynamometer equipped with both acoustic and vibration isolating capability so as to permit the testing of low speed high output motors, such as those hydraulically driven motors used on naval ships in an environment that requires operation without creating excessive vibration and acoustic noise.

SUMMARY OF THE INVENTION

It is a general purpose and object of the present invention to provide for the testing of low speed high output motors by acoustically quiet passive power absorbing device that is especially suited for absorbing the output of a low speed high output motor of the type commonly found in the shipboard environment of naval vessels.

It is a further object to provide such a power absorbing device in an isolated environment that nevertheless permits cooling of the device and mechanical movement of the components that exert the reactive torque on the rotational portion of the power absorbing device itself.

Another object is that the structure of the invention occupy minimal physical space so that the necessity for extensive safety shielding is minimized as well.

A further object of the present invention is to provide a passive load absorbing device with frequency characteristics outside the normal frequency range of the low speed high output motor being tested. Further, the load absorbing device of the present invention will permit the motor under test to be incrementally loaded without the need for changing mechanical loads of the type used heretofore. Such prior art devices rely on potential energy storing devices for testing such low speed high output motors.

These objects are accomplished with the present invention by providing a shock isolated passive load testing device especially adapted for use with low speed high output motors. The output shaft of the motor is coupled to a large disc by means of a flexible coupling. The disc is supported at its center for rotation on a vertical axis by a bearing assembly, and a plurality of brake calipers surround the disc periphery so that hydraulic pressure applied to the caliper cylinders squeezes friction pads inwardly against both sides of the disc. The entire assembly is immersed in a bath of cooling fluid which provides both acoustic and vibrational damping in addition to providing the required cooling for the disc and the friction pads.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying single FIGURE which shows a low speed high output motor in schematic fashion, the motor being isolated from the rotary dynamometer of the present invention except for the coupling provided between the motor output shaft and the rotating disc of the present invention.

DESCRIPTION OF THE PREFERRED EMBODIMENT

Referring now to the single FIGURE there is shown a low speed high output motor 10 to be tested. The motor 10 is mounted on top of a fixed motor support structure 12, with vibration isolating mounts provided between the motor 10 and the top 12a of the motor support structure. The motor 10 is provided with its output shaft 10a coupled to a rotatably supported disc 14. More specifically the output shaft 10a is coupled to a stub shaft 14a provided at the center of the disc 14 for this purpose. Preferably, the means for coupling the output shaft 10a of the motor 10 to the disc 14 includes an elastomeric coupling 16.

Still with reference to the sole FIGURE, the motor support structure 12 serves as a confinement cabinet for the power absorbing device to be described, including the rotary disc 14. The motor support structure 12 includes a generally cylindrical side wall 12b the lower edge of which is secured to fixed structure, as indicated generally at 18 in the FIGURE. The fixed structure 18 also serves to support a housing 20 for the device of the present invention including the rotary disc 14. The means for mounting the housing 20 to the fixed structure 18 preferably comprises vibration isolating mounts as indicated generally at 13. These mounts may comprise conventional rubber shock mounting material similar in construction to those specified in military spec: Mil-M-17508.

Elastomeric coupling devices of the type described above with reference to the coupling 16 may comprise conventional couplings of the type commercially available from Rexnord Corp. Coupling 16 isolates appreciably vibrational noise from stub shaft 14a of rotating disc 14 to the output shaft 10a of motor 10.

In accordance with the present invention bearing means is provided for the disc 14. The bearing means is indicated generally at 22 in the accompanying FIGURE and comprises a combination thrust and journal bearing for a downwardly extending portion 14b of the disc shaft 14a. As so constructed and arranged the disc 14 is rotatable in the bearing 22, and the bearing is provided in the bottom wall of the housing 20. As so arranged the housing can be provided with cooling fluid as indicated generally at 24 in the FIGURE. The cooling fluid circulates freely so as to lubricate the bearing 22, and to cool the disc 14, as well as to cool the caliper means 15.

The caliper means 15 is provided for braking the disc at circumaxially spaced locations around its periphery, and preferably said caliper means is hydraulically actuated as suggested generally at 26 in the FIGURE. A plurality of brake calipers are provided in spaced relation around the disc periphery. Each caliper has friction pads that are hydraulically actuated so as to exert a restraining torque on the disc 14 and to thereby impose a load on the output shaft 10a of the motor 10.

A further feature of the present invention resides in the fact that the brake pads provided in the calipers are also located in the cooling fluid 24 as a result of the unique geometry for the housing 20 that contains the disc 14, the bearing 22, and the caliper means 15.

In light of the above, it is therefore understood that within the scope of the appended claims, the invention may be practiced otherwise than as specifically described.

What is claimed is:

1. An acoustically quiet dynamometer for use with a low speed high output motor with an output shaft and comprising:
    first vibration isolating support means for the motor;
    bearing means;
    at least one disc rotatably supported in said bearing means;
    coupling means for joining said disc to the output shaft of the motor;
    caliper means including hydraulically actuated friction pads for engaging said disc;
    a housing for said disc and said friction pads; and
    a cooling fluid provided in said housing for cooling said disc and friction pads.

2. The dynamometer according to claim 1 further including a second vibration isolating means for said housing.

3. The dynamometer according to claim 2 wherein said bearing means is provided in a bottom wall of said housing, and wherein said motor is provided with the output shaft thereof oriented vertically, said at least one disc being rotatably supported for rotation on a vertical axis generally aligned with that of said motor output shaft, and said caliper means comprising individual brake calipers circumaxially spaced around the disc periphery.

4. The dynamometer according to claim 3 further including a motor support structure, said first vibration isolating support means provided between a top wall of said motor support structure and said motor to be tested.

5. The dynamometer according to claim 4 further having said motor support structure including a vertically oriented side supporting wall for said top wall, said top and side walls cooperating to provide an enclosure for the housing and the rotating disc, the friction pads, and the calipers.

6. The dynamometer according to claim 5 having a fixed structure, said motor support structure provided on said fixed structure, and wherein said second vibration isolating means for said housing is provided between said fixed structure and said housing.

* * * * *